United States Patent

Horiuchi et al.

[11] Patent Number: 5,803,557
[45] Date of Patent: Sep. 8, 1998

[54] ANTI-LOCK BRAKE CONTROL SYSTEM FOR VEHICLE

[75] Inventors: Yutaka Horiuchi; Yutaka Maruyama; Susumu Takahashi; Yoshikazu Nojiri; Ryo Suzuki; Toshio Yahagi, all of Wako, Japan

[73] Assignee: Honda Giken Kogyo Kabushiki Kaisha, Tokyo, Japan

[21] Appl. No.: 715,144

[22] Filed: Sep. 18, 1996

[30] Foreign Application Priority Data

Sep. 19, 1995 [JP] Japan .................................. 7-240071

[51] Int. Cl.$^6$ ...................................................... B60T 8/32
[52] U.S. Cl. .............................................. 303/173; 701/75
[58] Field of Search ................................ 303/166, 170, 303/171, 172, 173, 163, DIG. 7, 20; 701/74, 75

[56] References Cited

U.S. PATENT DOCUMENTS

| | | | |
|---|---|---|---|
| 4,802,711 | 2/1989 | Muto et al. | 303/170 |
| 4,807,941 | 2/1989 | Onogi et al. | 303/166 |
| 5,185,720 | 2/1993 | Okubo | 303/170 X |
| 5,200,897 | 4/1993 | Makino et al. | 303/DIG. 7 |
| 5,210,690 | 5/1993 | Kageyama et al. | 303/163 X |
| 5,699,251 | 12/1997 | Mori et al. | 303/173 X |

FOREIGN PATENT DOCUMENTS 6-144195  5/1994  Japan .

*Primary Examiner*—Lee W. Young
*Attorney, Agent, or Firm*—Nikaido, Marmelstein, Murray & Oram LLP

[57] ABSTRACT

In an anti-lock brake control system for a vehicle, first presumed vehicle speeds are calculated in first vehicle speed calculating devices for every wheel based on wheel speeds detected by wheel speed detecting sections. A second presumed vehicle speed is calculated in a second vehicle speed calculating device based on the value of a lower one of the first presumed vehicle speeds calculated in the first vehicle speed calculating devices corresponding to the left and right rear wheels. A higher one of the first presumed vehicle speeds calculated in each of the first vehicle speed calculating devices and the second presumed vehicle speed calculated in the second vehicle speed calculating device is selected as a presumed vehicle speed corresponding to the wheel in a high-select device. The operations of actuators are controlled based on results of calculation of slip rates of wheels based on presumed vehicle speeds and wheel speeds for every wheel. Thus, when a different-diameter tire has been mounted on any of the wheels, a presumed vehicle speed can be presumed with good accuracy to carry out an appropriate anti-lock brake control.

2 Claims, 4 Drawing Sheets

ANTI-LOCK BRAKE CONTROL SYSTEM FOR VEHICLE

BACKGROUND OF THE INVENTION

1. Field of the Invention

The present invention relates to an anti-lock brake control system for a vehicle, comprising: actuators capable of regulating the braking force for wheels, wheel speeds detecting sections for detecting wheel speeds of the wheels, a vehicle speed calculating section for calculating a presumed vehicle speed for every wheel based on the wheel speeds detected by the wheel speeds detecting sections, slip rate calculating sections for calculating slip rates of the wheels based on the wheel speeds detected by the wheel speeds detecting sections and the presumed vehicle speed for every wheel detected in the vehicle speed calculating section, operation control sections for determining the locking tendency for every wheel based on the slip rates calculated in the slip rate calculating sections and controlling the operations of the actuators based on the result of the determination.

2. Description of the Related Art

If the vehicle speed is represented by Vv and the wheel speed is represented by $V_W$, the slip rate $\lambda$ of the wheel is represented by a relation, $\lambda = (V_V - V_W)/V_V$. The coefficient of friction $\mu$ between a tire and a road surface (a road surface coefficient of friction) is a function of the slip rate $\lambda$, as shown in FIG. 4. The anti-lock brake control controls the braking force, so that the wheel speed $V_W$ falls into a range A shown in FIG. 4.

The vehicle speed $V_V$ is incapable of being directly measured by a sensor or the like. Hence, it is a common practice to measure the vehicle speed $V_V$ based on the wheel speeds $V_W$. For example, in an antilock brake control system disclosed in Japanese Patent Application Laid-open No. 6-144195, the higher speed of one of the following speeds is presumed as a vehicle speed: (1) a wheel speed of a wheel which is to be antilock braked, and (2) a speed resulting from the turn correction for reducing a difference between inner and outer wheel speeds, i.e., between the wheel speed of the one wheel and a highest one of the wheel speeds of all the wheels which is defined as a speed of the outermost wheel during turning of the vehicle. Thus, even if a locking tendency is produced in a certain wheel during braking, a speed based on the wheel speeds of the other wheels having no locking tendency and resulting from the turn correction is used as a presumed vehicle speed to enhance the vehicle speed presuming accuracy.

However, in a condition in which an emergency tire has been mounted on any of the wheels, the wheel speed of the wheel having the emergency tire mounted thereon is higher than the wheel speeds of the wheels each having a standard tire mounted thereon, because the radius of the emergency tire is generally smaller than that of a standard tire. For this reason, even if the vehicle speed corresponding to the wheel having the locking tendency is presumed based on the wheel speeds of the other wheels having no locking tendency, when an emergency tire has been mounted on the wheels having no locking tendency, there is a possibility that the calculation accuracy may be reduced by increasing the presumed vehicle speed, whereby an unnecessary anti-lock brake control for such a wheel may be carried out.

SUMMARY OF THE INVENTION

Accordingly, it is an object of the present invention to provide an anti-lock brake control system for a vehicle, wherein even in a condition in which a different-diameter tire, smaller in diameter than a standard tire, has been mounted on any of the wheels, the presumed vehicle speed is not increased to a value higher than required, and an appropriate anti-lock brake control can be carried out.

To achieve the above object, according to a first aspect and feature of the present invention, there is provided an anti-lock brake control system for a vehicle, comprising: actuators capable of regulating the braking forces for wheels, wheel speeds detecting sections for detecting wheel speeds of the wheels, a vehicle speed calculating section for calculating a presumed vehicle speed for every wheel based on the wheel speeds detected by the wheel speeds detecting sections, slip rate calculating sections for calculating slip rates of the wheels based on the wheel speeds detected by the wheel speeds detecting sections and the presumed vehicle speed for every wheel detected in the vehicle speed calculating section, operation control sections for determining the locking tendency for every wheel based on the slip rates calculated in the slip rate calculating sections and controlling the operations of the actuators based on the result of the determination, wherein the vehicle speed calculating section comprises: first vehicle speed calculating devices for calculating first presumed vehicle speeds for every wheel based on the wheel speeds detected by the wheel speed detecting sections, a second vehicle speed calculating device for calculating a second presumed vehicle speed based on a lower one of the first presumed vehicle speeds calculated in the first vehicle speed calculating device corresponding respectively to the left and right rear wheels, and a high-select device for selecting, as a presumed vehicle speed corresponding to a wheel to be braked, a higher one of the first presumed vehicle speed calculated for each wheel in each of the first vehicle speed calculating devices and the second presumed vehicle speed calculated in the second vehicle speed calculating device common to each the wheel.

With the above first feature of the present invention, when an emergency tire has been mounted on any of the wheels, the vehicle speed can be prevented from being presumed at a value larger than required, and an appropriate anti-lock brake control can be carried out.

According to a second aspect and feature of the present invention, in addition to the first feature, the anti-lock brake control system further includes a small-diameter detecting section for detecting that both the left and right rear wheels are smaller in diameter than the front wheels and for outputting a detection signal. The second vehicle speed calculating device comprises a low-select device for selecting a lower one of the first presumed vehicle speeds calculated in the first vehicle speed calculating device corresponding to the left and right rear wheels, respectively, and a correcting device for correcting the second presumed vehicle speed selected in the low-select device to eliminate a shortage of diameter of the rear wheels in response to a signal output from the small-diameter detecting section.

With the second feature of the present invention, when both the rear wheels are smaller in diameter than the front wheels, the vehicle speed can be presumed with a good accuracy by correcting the second presumed vehicle speed to eliminate the smaller diameter, thereby enhancing the antilock brake control accuracy.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of a preferred embodiment with reference to the accompanying drawings.

Figure 1:
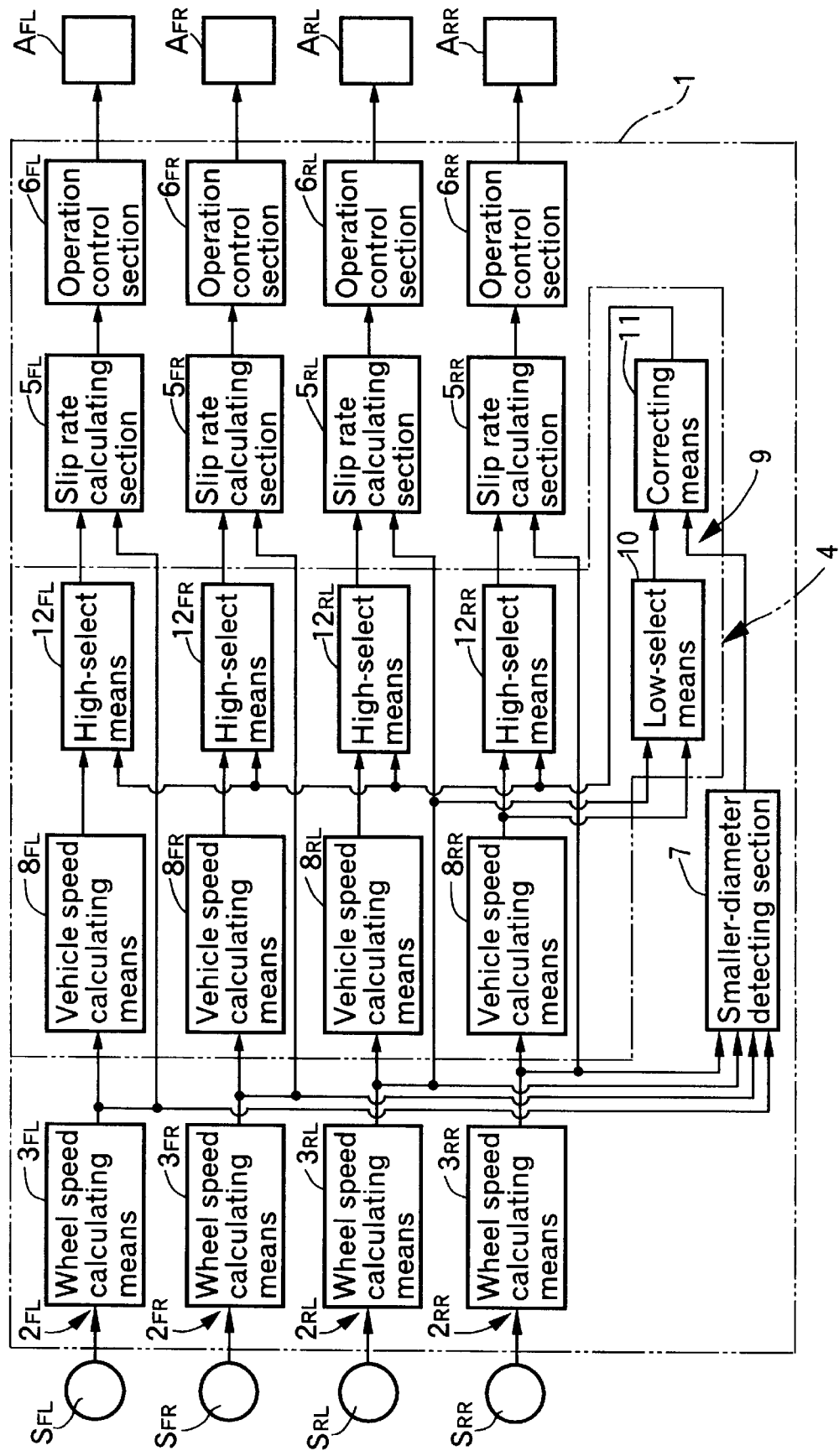
FIG. 1 is a block diagram illustrating the arrangement of an anti-lock brake control system according to an embodiment of the present invention.

Referring first to FIG. 1, the operation of each of the actuators $A_{FL}$, $A_{FR}$, $A_{RL}$ and $A_{RR}$, capable of individually regulating braking forces for left and right front and rear wheels, respectively, is controlled by a controller 1. Detection values detected by rotational speed sensors $S_{FL}$, $S_{FR}$, $S_{RL}$ and $S_{RR}$ for individually detecting rotational speeds of the wheels respectively are input to the controller 1.

The controller 1 includes wheel speed calculating means $3_{FL}$, $3_{FR}$, $3_{RL}$, and $3_{RR}$ individually connected to the rotational speed sensors $S_{FL}$, $S_{FR}$, $S_{RL}$ and $S_{RR}$, a small-diameter detecting section 7 for detecting that both of the left and right rear wheels are smaller in diameter than the front wheels, based on the wheel speeds determined in the wheel speed calculating means $3_{FL}$, $3_{FR}$, $3_{RL}$ and $3_{RR}$, thereby outputting detection signals, a vehicle speed calculating section 4 for calculating a presumed vehicle speed for every wheel based on the wheel speeds calculated in the wheel speed calculating means $3_{FL}$, $3_{FR}$, $3_{RL}$ and $3_{RR}$ and a signal from the small-diameter detecting section 7, slip rate calculating sections $5_{FL}$, $5_{FR}$, $5_{RL}$ and $5_{RR}$ for calculating slip rates of the wheels based on the wheel speeds calculated in the wheel speed calculating means $3_{FL}$, $3_{FR}$, $3_{RL}$ and $3_{RR}$ and the presumed vehicle speed for every wheel determined in the vehicle speed calculating section 4, and operation control sections $6_{FL}$, $6_{FR}$, $6_{RL}$ and $6_{RR}$ for determining a locking tendency of each of the wheels based on the slip rates determined in the slip rate calculating sections $5_{FL}$, $5_{FR}$, $5_{RL}$ and $5_{RR}$ and controlling the operations of the actuators $A_{FL}$, $A_{FR}$, $A_{RL}$ and $A_{RR}$ based on the result of the determination.

Wheel speed detection sections $2_{FL}$, $2_{FR}$, $2_{RL}$ and $2_{RR}$ are constructed by the rotational speed-sensors $S_{FL}$, $S_{FR}$, $S_{RL}$ and $S_{RR}$ and the wheel speed calculating means $3_{FL}$, $3_{FR}$, $3_{RL}$ and $3_{RR}$ individually corresponding to the rotational speed sensors $S_{FL}$, $S_{FR}$, $S_{RL}$ and $S_{RR}$. Wheel speeds of the wheels are detected in the wheel speed detection sections $2_{FL}$, $2_{FR}$, $2_{RL}$ and $2_{RR}$, respectively.

The vehicle speed calculating section 4 includes first vehicle speed calculating means $8_{FL}$, $8_{FR}$, $8_{RL}$ and $8_{RR}$ for calculating first presumed vehicle speeds for every wheel based on the wheel speeds in such a manner that when the acceleration or deceleration of each of the wheel speeds detected respectively by the wheel speed detecting sections $2_{FL}$, $2_{FR}$, $2_{RL}$ and $2_{RR}$ exceeds a preset acceleration or deceleration, the vehicle follows at the preset acceleration or deceleration. The vehicle speed calculating section 4 further includes a second vehicle speed calculating means 9 for calculating a second presumed vehicle speed based on a lower one of the first presumed vehicle speeds determined in the first vehicle speed calculating means $8_{RL}$ and $8_{RR}$ corresponding to the left and right rear wheels; and high-select means $12_{FL}$, $12_{FR}$, $12_{RL}$ and $12_{RR}$ for selecting, for every wheel, a higher one of the first presumed vehicle speed calculated in each of the vehicle speed calculating means $8_{FL}$, $8_{FR}$, $8_{RL}$ and $8_{RR}$ for each of the wheels and the second presumed vehicle speed calculated in the second vehicle speed calculating means 9 common to the wheels, as a presumed vehicle speed corresponding to such a wheel.

Each of the first vehicle speed calculating means $8_{FL}$, $8_{FR}$, $8_{RL}$ and $8_{RR}$ calculates the first presumed vehicle speed based on the wheel speed detected by the corresponding wheel speed detection sections $2_{FL}$, $2_{FR}$, $2_{RL}$ and $2_{RR}$, so that the vehicle speed is not equal to or lower than the preset deceleration. The second vehicle speed calculating means 9 includes a low-select means 10 for selecting a lower one of the first presumed vehicle speeds determined in the first vehicle speed calculating means $8_{RL}$ and $8_{RR}$ corresponding respectively to the left and right rear wheels, and a correcting means 11 for correcting the second presumed vehicle speed selected in the low-select means 10 in response to outputting of the detection signal from the small-diameter detecting section.

Figure 2:
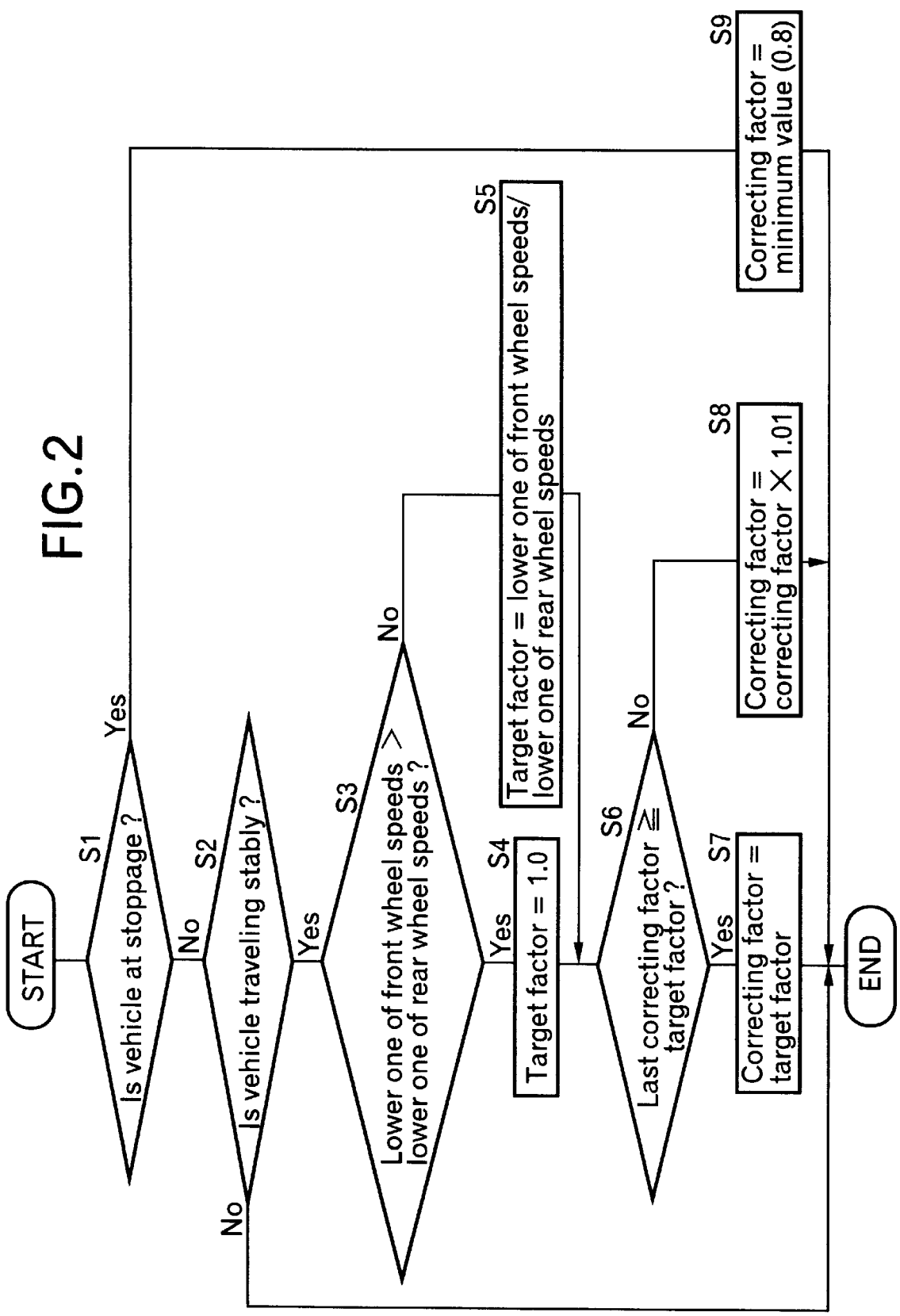
FIG. 2 is a flowchart illustrating a procedure for detection in the small-diameter detecting section and for setting a correcting factor.

In the small-diameter detecting section 7, the detection and the correcting-factor processing are conducted according to a procedure shown in FIG. 2. At step S1, it is determined whether the vehicle is stopped. If the vehicle is stopped, the correcting factor is set at a minimum value at step S9. Here, if studless tires or the like, which are smaller in diameter than diameters of standard tires, are mounted on both the rear wheels, the second presumed vehicle speed is increased. The correcting factor is set such as to correct such an increased amount of the second presumed vehicle speed due to the small diameter of the tires. The minimum value of the correcting factor is set, for example, at 0.8. Moreover, the reason why the correcting factor is set at a minimum value every time the vehicle is stopped, is that it is a fool-proof way to provide for the exchange of tires in a condition in which the vehicle has been stopped without stopping the engine.

If it is determined at step S1 that the vehicle is traveling, it is determined at step S2 whether the vehicle is traveling stably. The determination of "the vehicle is traveling stably" is at the time when all of the following conditions have been met:

(1) The range of variation in wheel speed of each wheel is equal to or smaller than a given value (the acceleration and deceleration are not sudden), (2) The absolute value of a difference between the wheel speeds of the left and right front wheels is equal to or smaller than a predetermined value, and (3) The absolute value of a difference between the wheel speeds of the left and right rear wheels is equal to or smaller than a predetermined value.

If it is determined at step S2 that the vehicle is traveling stably, it is determined at step S3 whether the value of a lower one of the wheel speeds of the left and right front wheels exceeds the value of a lower one of the wheel speeds of the left and right rear wheels. If the value of the lower one of the wheel speeds of the left and right front wheels exceeds the value of the lower one of the wheel speeds of the left and right rear wheels, then a target factor is set at 1.0 at step S4. Specifically, when the value of the lower one of the wheel speeds of the left and right front wheels exceeds the value of the lower one of the wheel speeds of the left and right rear wheels, it is determined that both the left and right rear wheels are not smaller in diameter that the front wheels, and from this determination, the target factor is set at 1.0.

When the value of the lower one of the wheel speeds of the left and right rear wheels is equal to or larger than the value of the lower one of the wheel speeds of the left and right front wheels at step S3, it is determined that both the left and right rear wheels are smaller in diameter than the front wheels, proceeding to step S5. At step S5, the target factor is set at a value equal to or smaller than 0.1 as "the value of the lower one of the front wheel speeds/the value of the lower one of the rear wheel speeds".

At step S6 after passing through step S4 or S5, it is determined whether the correcting factor determined at the last time is equal to or larger than the target factor at the current time. If the last correcting factor is greater than or equal to the current target factor, then the correcting factor is set at a value equal to the target factor at step S7. On the other hand, if the last correcting factor is less than the current target factor, then the correcting factor is set at a value of "correcting factor (last time)×1.01" at step S8. When it is determined at step S6 that the last correcting factor is greater than or equal to the current target factor, the correct factor is immediately switched. In contrast, when it is determined at step S6 that the last correcting factor is less than the current target factor, thereby increasing the correcting factor, the increase rate is limited at step S8.

Referring again to FIG. 1, in the correcting means 11, the correction is carried out by multiplying the second presumed vehicle speed selected in the low-select means 10 by the correcting factor determined in the small-diameter detecting section 7. When it is detected by the small-diameter detecting section 7 that both the left and right rear wheels are smaller in diameter than the front wheels, the second presumed vehicle speed is multiplied by a correcting factor smaller than 1 and thus corrected to eliminate an error due to smaller diameter of the rear wheels. The second presumed vehicle speed resulting from the correction and output from the correcting means 11 is input to each of the high-select means $12_{FL}$, $12_{FR}$, $12_{RL}$ and $12_{RR}$.

The operation of this embodiment will be described below. In each of the slip rate calculating sections $5_{FL}$, $5_{FR}$, $5_{RL}$ and $5_{RR}$ for the wheels, a slip rate is calculated based on the wheel speed detected by each of the wheel speed detection sections $2_{FL}$, $2_{FR}$, $2_{RL}$ and $2_{RR}$ and the presumed vehicle speed for each wheel determined in the vehicle speed calculating section 4. The locking tendency of each wheel is determined in each of the operation control sections $6_{FL}$, $6_{FR}$, $6_{RL}$ and $6_{RR}$ based on the slip rate, and the operation of each of the actuators $A_{FL}$, $A_{FR}$, $A_{RL}$ and $A_{RR}$ is controlled based on the result of the determination. In the vehicle speed calculating section 4, the value of a higher one of the following first and second presumed vehicle speeds (1) and (2) is selected as a presumed vehicle speed by comparison of the speeds: (1) the first presumed vehicle speed determined for each wheel in each of the first vehicle speed calculating means $8_{FL}$, $8_{FR}$, $8_{RL}$ and $8_{RR}$ based on the wheel speed detected by each of the wheel speed detecting sections $2_{FL}$, $2_{FR}$, $2_{RL}$ and $2_{RR}$ and (2) the second presumed vehicle speed calculated in the second vehicle speed calculating means based on a lower one of the first presumed vehicle speeds calculated in the first vehicle speed calculating means $8_{RL}$ and $8_{RR}$.

Figure 3:
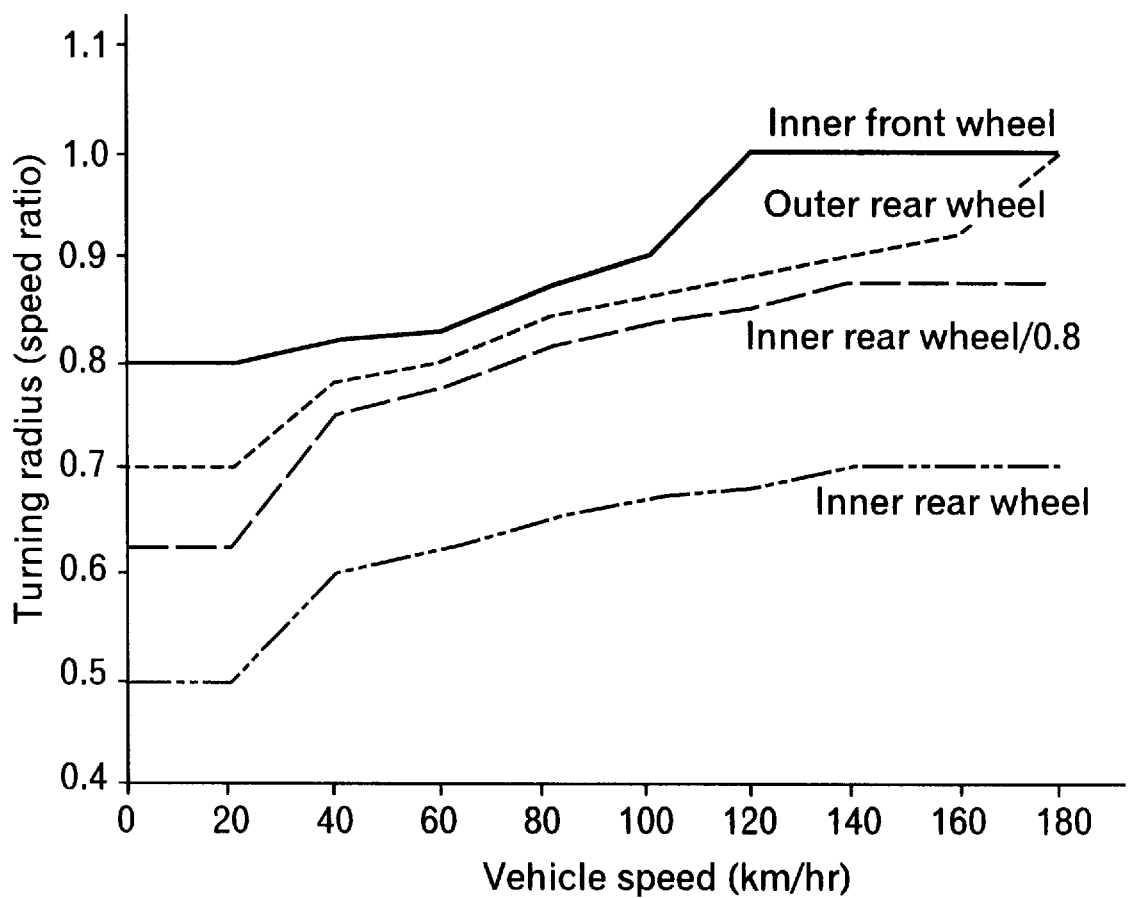
FIG. 3 is a graph illustrating the speed ratio between the wheel speeds of the inner rear wheel, the outer rear wheel and the inner front wheel during turning of the vehicle.
Figure 4:
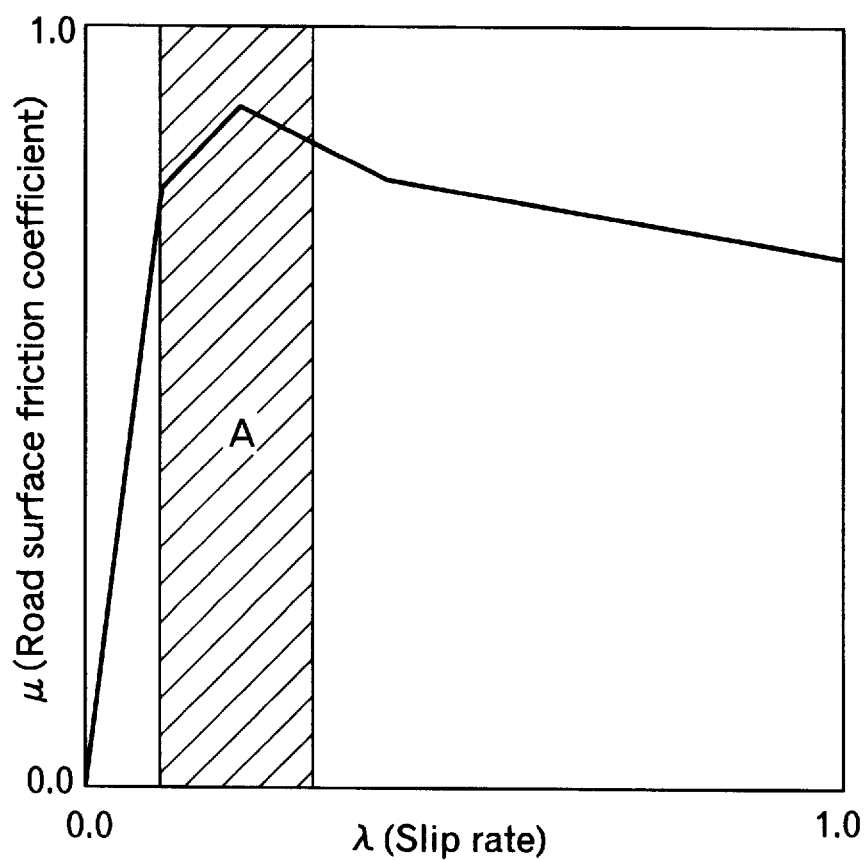
FIG. 4 is a graph illustrating the relationship between the road surface coefficient of friction and the slip rate.

Here, the ratio in speed between the inner front wheel, the outer rear wheel and the inner rear wheel during turning of the vehicle with no emergency tire mounted on each wheel is as shown in FIG. 3. The ratio of the inner rear wheel speed to the outer rear wheel speed, which is normally lower than the inner front wheel speed, is about 70 percent at a minimum. On the other hand, the minimum diameter of an emergency tire is generally about 80 percent of a standard tire. If an emergency tire is mounted on the inner rear wheel, then the wheel speed of the inner rear wheel cannot be higher than the wheel speed of the outer rear wheel. For this reason, the vehicle speed selected in the low-select means 10 when the wheel having the emergency tire mounted thereon is the inner rear wheel, can be the first presumed vehicle speed based on the wheel speed of the wheel having the emergency tire mounted thereon, and the vehicle speed selected in the low-select means when the wheel having the emergency tire mounted thereon is the outer rear wheel, can be the first presumed vehicle speed based on the wheel speed of the inner rear wheel having the emergency tire mounted thereon. Therefore, when the locking tendency is produced in the rear wheels to result in reduced wheel speeds, the presumed vehicle speed selected in the high select means $12_{RL}$ and $12_{RR}$ cannot be a value equal to or higher than the wheel speeds. When the locking tendency is produced in the front wheel to result in reduced wheel speeds, the presumed vehicle speed selected in the high select means $12_{FL}$ and $12_{FR}$ cannot be a value equal to or higher than the wheel speed provided by a standard tire, because the wheel speeds of the front wheels are larger-than the wheel speed of the outer rear wheel. In other words, even if the emergency tire is mounted on any one of the four front and rear, left and right wheels, the presumed vehicle speed equal to or higher than the wheel speed provided by a standard tire cannot be selected in the high-select means $12_{FL}$, $12_{FR}$, $12_{RL}$ and $12_{RR}$ corresponding to the wheel with the locking tendency produced therein, and unnecessary anti-lock brake control can be avoided to prevent a reduction in braking force.

In a condition in which small-diameter tires, such as studless tires, have been mounted on both the left and right rear wheels, respectively, the second presumed vehicle speed is corrected in the correcting means to eliminate the small diameter to correct the increase in second presumed vehicle speed due to the smaller diameter of the tires. Therefore, the second presumed vehicle speed calculated in the second vehicle speed calculating means 9 can be prevented from being too large, and an appropriate anti-lock brake control can be carried out.

Although the embodiment of the present invention has been described in detail, it will be understood that the present invention is not limited to the above-described embodiment, and various modifications may be made without departing from the spirit and scope of the invention detailed in the claims.

What is claimed is:

1. An anti-lock brake control system for a vehicle, comprising: actuators capable of regulating the braking forces for wheels, wheel speeds detecting sections for detecting wheel speeds of the wheels, a vehicle speed calculating section for calculating a presumed vehicle speed for every wheel based on the wheel speeds detected by said wheel speeds detecting sections, slip rate calculating sections for calculating slip rates of the wheels based on the wheel speeds detected by said wheel speeds detecting sections and the presumed vehicle speed for every wheel detected in said vehicle speed calculating section, operation control sections for determining the locking tendency for every wheel based on the slip rates calculated in said slip rate calculating sections and controlling the operations of said actuators based on the result of the determination, wherein said vehicle speed calculating section comprises:
first vehicle speed calculating means for calculating first presumed vehicle speeds for every wheel based on the wheel speeds detected by said wheel speed detecting sections;
second vehicle speed calculating means for calculating a second presumed vehicle speed based on a lower one of the first presumed vehicle speeds calculated in said first vehicle speed calculating means corresponding respectively to the left and right rear wheels; and high-select means for selecting, as a presumed vehicle speed corresponding to a wheel to be braked, a higher one of the first presumed vehicle speed calculated for each wheel in each of said first vehicle speed calculating means and the second presumed vehicle speed calculated in said second vehicle speed calculating means common to each wheel.

2. An antilock brake control system for a vehicle according to claim 1, further including a small-diameter detecting section for detecting that both the left and right rear wheels are smaller in diameter than the front wheels and for outputting a detection signal, and wherein said second vehicle speed calculating means comprises a low-select means for selecting a lower one of the first presumed vehicle speeds calculated in said first vehicle speed calculating means corresponding to the left and right rear wheels, respectively, and a correcting means for correcting the second presumed vehicle speed selected in said low-select means to eliminate an effect of a small diameter of the rear wheels in response to a signal output from said small-diameter detecting section.

* * * * *